United States Patent [19]

Ong et al.

[11] Patent Number: 5,429,793
[45] Date of Patent: Jul. 4, 1995

[54] SCALEABLE PROCESS FOR PRODUCING NI-AL ODS ANODE

[75] Inventors: Estela T. Ong, Chicago; Nellie Burton-Gorman, Justice, both of Ill.

[73] Assignee: Institute of Gas Technology, Chicago, Ill.

[21] Appl. No.: 243,277

[22] Filed: May 17, 1994

[51] Int. Cl.$^6$ ................................................. B22F 3/23
[52] U.S. Cl. ............................................ 419/45; 419/2; 419/38; 419/46; 419/57; 419/60
[58] Field of Search .................... 419/2, 38, 46, 45, 57, 419/60; 148/513, 32, 126, 123

[56] References Cited

U.S. PATENT DOCUMENTS

| | | | |
|---|---|---|---|
| 3,179,515 | 4/1965 | Grant et al. | 75/206 |
| 3,184,835 | 5/1965 | Coxe et al. | 29/182.5 |
| 3,399,086 | 8/1968 | Das et al. | 148/32 |
| 3,779,714 | 12/1973 | Nadkarni et al. | 29/182.5 |
| 3,802,878 | 4/1974 | Lindstrom | 75/208 R |
| 3,912,552 | 10/1975 | Schultz et al. | 148/31 |
| 4,239,557 | 12/1980 | Thellmann et al. | 148/126 |
| 4,436,794 | 3/1984 | Takeuchi et al. | 429/40 |
| 4,659,379 | 4/1987 | Singh et al. | 75/234 |
| 4,714,586 | 12/1987 | Swarr et al. | 419/2 |
| 4,999,155 | 3/1991 | Ong et al. | 419/2 |
| 5,049,355 | 9/1991 | Gennari et al. | 420/425 |
| 5,110,541 | 5/1992 | Yamamasu et al. | 419/2 |
| 5,229,221 | 7/1993 | Donado et al. | 429/13 |
| 5,312,580 | 5/1994 | Erickson et al. | 419/2 |
| 5,312,582 | 5/1994 | Donado | 419/19 |

Primary Examiner—Donald P. Walsh
Assistant Examiner—John N. Greaves
Attorney, Agent, or Firm—Speckman, Pauley & Fejer

[57] ABSTRACT

A process for producing metal oxide dispersion-strengthened anodes for use in fuel cells in which a metal alloy powder comprising at least one metal powder and at least one metal oxide forming phase is formed into a "green" cohesive structure. The "green" cohesive structure is heated in a sintering furnace resulting in simultaneous sintering and internal oxidizing of the oxide forming phase within the "green" cohesive structure, forming an oxide dispersion-strengthened structure. To promote simultaneous sintering of the "green" cohesive structure and internal oxidation of the oxide forming phase within the "green" cohesive structure, an oxidizing agent is disposed within the "green" cohesive structure or is applied to the exterior of the cohesive structure.

11 Claims, No Drawings

SCALEABLE PROCESS FOR PRODUCING NI-AL ODS ANODE

BACKGROUND OF THE INVENTION

1. Field of the Invention This invention relates to oxide dispersion-strengthened anodes for use in fuel cells, in particular nickel-aluminum (Ni—Al) oxide dispersion-strengthened anodes for use in molten carbonate fuel cells. This invention also relates to a process for producing said oxide dispersion-strengthened anodes. Oxide dispersion-strengthened anodes produced in accordance with this process have improved anode creep resistance properties.

2. Description of Prior Art

Molten carbonate fuel cells generally comprise two electrodes with their current collectors, a cathode and an anode, an electrolyte tile making contact with both the electrodes, and a cell housing to physically retain the cell components and to provide contacts between the electrodes and the reactant gases. Under fuel cell operating conditions, in the range of about 500° C. to about 700° C., the entire electrolyte tile, consisting of the carbonate and the inert support material, forms a two phase structure with liquid carbonate and said inert support. The electrolyte diaphragms of this type are known as "matrix type" or "paste type" electrolytes. The electrolyte is in direct contact with the electrodes where the three-phase reactions (gas-electrolyte-electrode) take place. Hydrogen is consumed in the anode area producing water, carbon dioxide and electrons. The electrons flow to the cathode through an external circuit producing the desired current flow. At the anode there must be ready entry for the reactant gas, ready exit for the chemical reaction products and ready exit for the product electrons. To maintain a high level of stable, long term performance, both electrolyte and electrode design and properties must be optimized and stabilized at the gas-electrolyte-electrode interface.

Porous anodes of nickel, cobalt, or copper have been previously used in molten carbonate fuel cells. These anodes typically require stabilizing agents to maintain porosity and surface area during fuel cell operation. The stabilizing agents are usually added in about 1–10 weight percent, based upon the metal. The stabilizing particles are dispersed on the base metal surface, prohibiting the structure from sintering at molten carbonate fuel cell temperatures of 500° C. to 700° C.

Molten carbonate fuel cells have typically used nickel, cobalt, and copper based anode structures. These anodes tend to be dimensionally unstable, losing thickness by creep deformation within the fuel cell stack. Creep deformation occurs as a result of a holding force applied to keep the components in a fuel cell stack in good contact. Creep of electrodes occurs by combination of at least three different creep mechanisms: particle rearrangement, sintering, and dislocation movement. The surface dispersion of stabilizing particles used in prior art methods does not inhibit creep by dislocation movement. The creep of these anodes under the loaded conditions of a fuel cell stack is not acceptable.

Various methods have been used to attempt to inhibit creep deformation in the anode structures. One method has been to internally oxidize the alloying metal used in the base metal-alloying metal composition typically used to form the porous anode structures. For example, U.S. Pat. No. 4,999,155 teaches a method for forming a porous oxide dispersion-strengthened molten carbonate fuel cell anode in which a Ni—Al alloy powder is formed into a structure and internally oxidized by heat treating in the presence of a NiO Rhines pack. The NiO Rhines pack is a mixture of NiO and Ni and includes some inert particles, such as $Al_2O_3$. U.S. Pat. No. 5,229,221 teaches a method for fabricating anodes in which an alloy powder having a base metal and an alloying metal is preformed into a desired shape and sintered in pure dry $H_2$, a dry inert gas, or a vacuum, and subsequent thereto, oxidized in-situ in a fuel cell. U.S. Pat. No. 4,659,379 teaches a method for producing a nickel anode electrode in which a nickel alloying material is oxidized to produce a material whose exterior contains nickel oxide and whose interior contains nickel metal throughout which is dispersed the oxide of the alloying material. The oxidized material is then reduced and sintered to convert the nickel oxide outer layer to nickel metal and to provide an interior containing nickel metal throughout which is dispersed the oxide of the alloying material. Finally, U.S. Pat. No. 3,779,714 teaches a process for producing dispersion-strengthened hard metal by internal oxidation in which a powder alloy comprising a matrix metal and a solute metal and oxidant comprising an in-situ heat-reducible metal oxide and a finely divided hard refractory metal oxide are combined into an intimate mixture. The alloy mixed with the oxidant is internally oxidized by heating to oxidize the solute metal of the alloy and to form a residue of the oxidant. Thereafter, the internally oxidized alloy and the oxidant residue are thermally coalesced into dispersion-strengthened metal stock. Suitable matrix metals and solute metals for formation of the alloy are indicated to be nickel and aluminum, respectively, while a suitable heat-reducible metal oxide and a finely divided, hard refractory metal oxide for formation of the oxidant are indicated to be NiO and $Al_2O_3$. Dispersion-strengthened hard metal stock produced in accordance with the teachings of the '714 patent is not suitable for use as an anode in a fuel cell, lacking the porosity required in such anodes.

A dispersion-strengthened nickel-base alloy comprising correlated amounts of iron, chromium, and aluminum is taught by U.S. Pat. No. 3,912,552. A process for producing an oxide dispersion-hardened sintered alloy based on a metal having a high melting point in which a powder mixture of the base metal and a dispersoid comprising a metal oxide powder is pressed into a pressed, blank form and sintered at temperatures such that the dispersoid is decomposed into its constituent components and the constituent components are homogeneously dispersed throughout the base metal is taught by U.S. Pat. No. 5,049,355. U.S. Pat. No. 5,110,541 teaches mixing an Al-based intermetallic compound with Ni to form a slurry which is shaped into a sheet or a tape and subsequently sintered to form a porous electrode.

U.S. Pat. No. 4,714,586 teaches a method for preparing stable Ni—Cr anodes for use in a molten carbonate fuel cell stack in which a low chromium-to-nickel alloy is provided and oxidized in a mildly oxidizing gas of sufficient oxidation potential to oxidize chromium in the alloy structure. A steam/$H_2$ gas mixture in a ratio of about 100/1 and at a temperature below 800° C. is used as the oxidizing medium.

In general, known processes for producing oxide dispersion-strengthened anodes have the disadvantages that they require multiple heating steps and employ atmospheres, such as atmospheres having very high $H_2O/H_2$ ratios, which are fairly corrosive to metallic furnace walls containing such atmospheres. For example, the '586 patent describes the fabrication of a Ni—Cr oxide dispersion-strengthened anode by first sintering a Ni—Cr anode plaque and then internally oxidizing the anode in an atmosphere having a high $H_2O/H_2$ ratio. The '379 patent requires multiple oxidation and sintering steps, the oxidation being carried out in air or in an $H_2O/H_2$ atmosphere while sintering is performed in a reducing atmosphere. The '155 patent also teaches a process employing multiple heating steps, but more importantly, the pre-oxidized surface layer produced in accordance with the disclosed process is not cohesive with the internal volume of the resulting anode. Finally, in accordance with the teachings of the '122 patent, internal oxidation is allowed to take place in the fuel cell. The stringent requirement for the sintering atmosphere makes it difficult to carry out the process in a continuous sintering furnace, thereby impeding the production rate. In addition, in-situ internal oxidation is a process that changes the anode microstructure and, thus, may effect the electrochemical performance of the fuel cell.

SUMMARY OF THE INVENTION

Accordingly, it is an object of this invention to provide a process for preparing oxide dispersion-strengthened anodes for molten carbonate fuel cells requiring only a single heating step to sinter and oxidize the electrode.

It is another object of this invention to provide a process for preparing oxide dispersion-strengthened anodes in which the oxidized phase is homogeneously dispersed throughout the anode.

It is another object of this invention to provide a process for producing oxide dispersion-strengthened anodes which eliminates the need for atmospheres employed in the heating step which are corrosive to metallic furnace walls of furnaces containing the atmospheres.

It is yet another object of this invention to provide a process for preparing oxide dispersion-strengthened electrodes in which the long period of time normally required for internal oxidation of the electrode is substantially reduced.

These and other objects of this invention are achieved by a process for producing porous metal oxide dispersion-strengthened anodes for use in fuel cells comprising the steps of forming a fine metal alloy powder comprising at least one metal powder and at least one oxide forming phase into a "green" cohesive structure and sintering the "green" cohesive structure. Simultaneously with the sintering of the "green" cohesive structure, the oxide forming phase within the "green" cohesive structure is internally oxidized, producing an oxide dispersion-strengthened porous structure.

The process of this invention is particularly suited to the production of metal oxide dispersion-strengthened anodes suitable for use in molten carbonate fuel cells. In a particularly preferred embodiment of the process of this invention, the fine metal alloy powder comprises a mixture of nickel and aluminum powders, the aluminum powder comprising the oxide forming phase which is simultaneously oxidized during sintering of the "green" cohesive structure. To promote oxidation throughout the "green" cohesive structure in accordance with one embodiment of the process of this invention, an oxidizing agent in the form of nickel oxide (NiO) is mixed with the fine metal alloy powder prior to sintering of the "green" cohesive structure resulting in homogeneous dispersion of the oxidizing agent throughout the "green" cohesive structure. In accordance with another embodiment of the process of this invention, the oxidizing agent is applied to the exterior of the "green" cohesive structure so as to cover the exterior thereof.

DESCRIPTION OF PREFERRED EMBODIMENTS

Ni—Al oxide dispersion-strengthened anodes are known for their resistance to creep deformation which occurs as a result of the holding force applied to keep the components of a fuel cell stack in good contact. Ni—Al oxide dispersion-strengthened anodes utilize fine Ni—Al alloy powder which is typically formed into a flat tape structure, sintered to a cohesive structure and internally oxidized to form the creep inhibitor $Al_2O_3$. What makes the fabrication of the anode difficult is the poor sinterability of the Ni—Al alloy powder and the special gas atmosphere and long period of time required for internal oxidation of the structure.

In particular, the Al phase, the oxide forming phase, in the Ni—Al alloy readily diffuses to the surface of the "green" cohesive structure where it oxidizes and, thus, inhibits sintering. To sinter the "green" cohesive structure, the Al phase must be kept within the grain by providing an extremely inert atmosphere or by oxidizing it within the grain. To internally oxidize the Al phase, an atmosphere that is highly oxidizing to the Al, but still reducing to the Ni, is required. In accordance with known processes, an atmosphere having a very high $H_2/H_2$ ratio which is fairly corrosive to the metallic furnace wall of the sintering furnace containing the atmosphere is usually employed.

In accordance with one embodiment of the process of this invention, these problems are overcome by simultaneous sintering and internal oxidation of the Ni—Al alloy "green" cohesive structure in an inert atmosphere, such as a dry nitrogen ($N_2$) atmosphere. Other suitable atmospheres for carrying out the simultaneous sintering and internal oxidation of the Ni—Al alloy cohesive structure include argon (Ar) and helium (He). The sintering and internal oxidation may also be conducted in a vacuum. To promote oxidation of the oxide forming phase of the Ni—Al alloy structure, an oxide powder that provides a high oxygen partial pressure is used as an oxidation agent. In accordance with one embodiment of the process of this invention, the oxidizing agent is contained within the "green" cohesive structure while in accordance with another embodiment, the oxidation agent externally blankets the "green" cohesive structure. When heated in a furnace in a dry, inert atmosphere such as nitrogen, argon or helium, or in vacuum, the oxidizing agent provides the oxygen needed to oxidize the Al oxide forming phase by virtue of thermodynamic equilibria.

The oxidizing agent in accordance with the process of this invention is a metal oxide that is thermodynamically less stable than the oxide of the alloying metal of the anode base metal, that is, the oxide forming phase. For example, in accordance with one embodiment of the process of this invention in which the metal alloy powder is a Ni—Al alloy, Ni is the base metal and Al s the oxide forming phase or alloying metal. Suitable oxidizing agents for the alloy metal Al in accordance with the process of this invention comprise CuO, NiO, Cu$_2$O, CoO, FeO, Fe$_2$O$_3$, Fe$_3$O$_4$ and mixtures thereof, each of which oxide is less stable than the oxide of Al and, thus, are readily reduced by Al according to the displacement reactions:

CuO + Al ⇌ Al$_2$O$_3$ + Cu
NiO + Al ⇌ Al$_2$O$_3$ + Ni
FeO + Al ⇌ Al$_2$O$_3$ + Fe
CoO + Al ⇌ Al$_2$O$_3$ + Co

Other anode base metals suitable for use in the metal alloy powders in accordance with the process of this invention include Cu and Co. Other oxide forming phase or alloying metals suitable for use in accordance with the process of this invention are any elements whose oxide products are refractory. In accordance with one embodiment of the process of this invention, the alloy oxide forming phase metal is selected from the group consisting of Ti, Y, Zr, Cr and mixtures thereof. In accordance with a preferred embodiment of the process of this invention, the amount of alloying metal in said metal alloy powder is between about 0.1% and about 10% by weight.

The amount of oxidizing agent employed in the process of this invention varies depending on whether the oxidizing agent is mixed with the metal alloy powder and incorporated into the "green" cohesive structure or provided as an external blanket to the "green" cohesive structure. In accordance with one embodiment of the process of this invention in which the oxidizing agent is mixed with the metal alloy powder and incorporated into the "green" cohesive structure, the amount of oxidizing agent used is in the range of about one-half of the stoichiometric equivalent of oxygen required to completely oxidize the alloying metal to about three (3) times said stoichiometric equivalent. In accordance with another embodiment of the process of this invention in which the oxidizing agent is applied as an external blanket to the "green" cohesive structure, the amount of oxidizing agent used is in the range of about one-half of the stoichiometric equivalent of oxygen required to completely oxidize the alloying metal to about one hundred (100) times said stoichiometric equivalent.

In accordance with one embodiment of the process of this invention in which the oxidizing agent is provided as an external blanket to the "green" cohesive structure, said external blanket further comprises additives such as inert fillers, for example Al$_2$O$_3$ and ZrO$_2$, to disperse the oxidizer and provide sufficient material to cover the "green" cohesive structure entirely and a screen to retain the oxidizing agent so that it can readily be separated from the anode.

In contrast to known processes for producing creep resistant anodes, the process of this invention is cost effective because no costly additive is required. For example, in accordance with one embodiment of the process of this invention in which NiO is employed as the oxidizing agent, when incorporated within the "green" cohesive structure, the reduced NiO simply becomes part of the anode. Its amount is no more than the stoichiometric equivalent of the Al content of the tape. In accordance with another embodiment of the process of this invention in which the oxidizing agent is applied to the exterior surface of the "green" cohesive structure, the NiO blanket is easily regenerated by heating in air to gain back its lost oxygen. In addition, the process of this invention is amenable to mass production because a dry N$_2$ atmosphere can be easily supplied to continuous sintering furnaces and has no deleterious effect on the sintering furnace.

We have successfully sintered a NiO+Ni—3Al tape containing as low as 10 weight percent NiO in an argon (Ar) atmosphere at 1100° C. for one (1) hour. We have, similarly, successfully sintered a NiO+N—3Al tape containing as low as 10 weight percent NiO in a dry N$_2$ atmosphere at 1000° C. for 30 minutes. Although these sintering conditions are by no means optimum, importantly from a large scale production point-of-view, they are achievable in continuous sintering furnaces. In addition, NiO content may be further reduced if the higher concentrations are found to increase anode creep. In both of these instances, the greenish tint of the NiO oxidizing agent disappeared during sintering and an entirely grayish nickel colored anode was obtained.

We have also successfully demonstrated sintering of a Ni—3Al tape, that is a tape without the oxidizing agent NiO dispersed throughout the tape by sandwiching the Ni—3Al tape between two (2) NiO tapes and heating the sandwich in a dry N$_2$ atmosphere at a temperature of 1100° C. for thirty (30) minutes. The heat treated anode was cohesive and gained weight, as expected. The surfaces of the originally green NiO tapes facing the Ni—3Al tape turned nickel grey after the heat treatment step as a result of the oxygen transfer process.

Based on the results of these tests, it will be apparent to those skilled in the art that a small amount of NiO may be added to the Ni—Al tape while simultaneously covering the external surfaces of the tape with a NiO blanket to optimize anode strength and sintering conditions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for producing porous metal oxide dispersion-strengthened anodes for use in fuel cells comprising the steps of:
    forming a "green" cohesive structure comprising a fine metal alloy powder comprising at least one metal powder and at least one oxide forming phase; and
    simultaneously sintering said "green" cohesive structure and internally oxidizing said oxide forming phase within said "green" cohesive structure, forming an oxide dispersion-strengthened porous anode.

2. A process in accordance with claim 1, wherein said at least one metal powder is selected from the group consisting of nickel (Ni), cobalt (Co), copper (Cu) and mixtures thereof.

3. A process in accordance with claim 2, wherein said at least one oxide forming phase is selected from the group consisting of aluminum (Al), chromium (Cr), zirconium (Zr), titanium (Ti), yttrium (Y) and mixtures thereof.

4. A process in accordance with claim 3, wherein said fine metal powder alloy is a Ni—Al alloy powder.

5. A process in accordance with claim 1, wherein said oxide forming phase is internally oxidized with an oxidizing agent that is at least one of disposed within said "green" cohesive structure and covers the exterior of said "green" cohesive structure.

6. A process in accordance with claim 5, wherein said oxidizing agent is an oxide which is readily reduced by said oxide forming phase.

7. A process in accordance with claim 6, wherein said oxide powder is selected from the group consisting of NiO, $Cu_2O$, CuO, FeO, $Fe_2O_3$, $Fe_3O_4$, CoO and mixtures thereof.

8. A process in accordance with claim 1, wherein said "green" cohesive structure is sintered in one of a dry, inert atmosphere and a vacuum.

9. A process in accordance with claim 8, wherein said dry, inert atmosphere comprises a gas selected from the group consisting of $N_2$, Ar, He, and mixtures thereof.

10. A process in accordance with claim 1, wherein said oxide forming phase comprises between about 0.1% and about 10% by weight of said metal alloy powder.

11. A process in accordance with claim 5, wherein the amount of said oxidizing agent is between about one-half of a stoichiometric equivalent of oxygen and about 100 times said stoichiometric equivalent of oxygen required for complete oxidation of said oxide forming phase.

* * * * *